United States Patent
Kantola et al.

(10) Patent No.: US 9,945,480 B2
(45) Date of Patent: Apr. 17, 2018

(54) PISTON ASSEMBLY INCLUDING A POLYMER COATING WITH HARD PARTICLES APPLIED TO SLIDING SURFACES

(71) Applicant: Federal-Mogul Corporation, Southfield, MI (US)

(72) Inventors: Troy Kantola, Whitmore Lake, MI (US); Andrew J. Miller, Plymouth, MI (US); Steven Krause, Plymouth, MI (US); Achim Adam, Nauheim (DE); Joachim Schlueter, Wiesbaden (DE)

(73) Assignee: Federal-Mogul LLC, Southfield, MI (US)

( * ) Notice: Subject to any disclaimer, the term of this patent is extended or adjusted under 35 U.S.C. 154(b) by 1055 days.

(21) Appl. No.: 13/661,597

(22) Filed: Oct. 26, 2012

(65) Prior Publication Data

US 2013/0220115 A1    Aug. 29, 2013

Related U.S. Application Data

(63) Continuation-in-part of application No. 13/142,887, filed on Jun. 30, 2011.
(Continued)

(51) Int. Cl.
*F02F 3/22* (2006.01)
*F16J 1/00* (2006.01)
(Continued)

(52) U.S. Cl.
CPC .............. *F16J 1/006* (2013.01); *F16J 1/12* (2013.01); *F02B 3/06* (2013.01); *F02F 3/00* (2013.01);
(Continued)

(58) Field of Classification Search
CPC ........ F05C 2201/021; F05C 2201/0448; F02F 3/22; F02F 3/00; F02B 3/06
(Continued)

(56) References Cited

U.S. PATENT DOCUMENTS

| | | |
|---|---|---|
| 4,440,069 A | 4/1984 | Holtzberg et al. |
| 4,868,067 A | 9/1989 | Fujisawa et al. |

(Continued)

FOREIGN PATENT DOCUMENTS

| | | |
|---|---|---|
| DE | 102005009552 A1 | 9/2006 |
| DE | 102008055194 | 7/2010 |

(Continued)

OTHER PUBLICATIONS

Diamond Composite Technology, Process Specifications, Apr. 25, 2003, UK Abrasives, p. 1.*
(Continued)

*Primary Examiner* — Jacob Amick
*Assistant Examiner* — Charles Brauch
(74) *Attorney, Agent, or Firm* — Robert L. Stearns; Dickinson Wright, PLLC

(57) ABSTRACT

A piston assembly comprises a piston body, a connecting rod, and a wrist pin. The piston body includes a pair of first cross bores presenting a piston sliding surface. The connecting rod includes a second cross bore presenting a rod sliding surface which is axially aligned with the first cross bores of the piston body. A wrist pin is disposed in the aligned cross bores and couples the piston body to the connecting rod. The wrist pin also presents a pin sliding surface facing the rod sliding surface and the piston sliding surfaces. A coating is applied to at least one of the sliding surfaces, such as by dipping, brushing, atomizing, spraying, printing, or screen printing. The coating includes a polymer matrix, such as polyamide imide (PAI), and hard particles, such as $Fe_2O_3$,
(Continued)

disposed throughout the polymer matrix. The hard particles have a hardness of at least 600 HV/0.5.

21 Claims, 3 Drawing Sheets

Related U.S. Application Data

(60) Provisional application No. 61/551,998, filed on Oct. 27, 2011.

(51) Int. Cl.
*F16J 1/12* (2006.01)
*F02F 3/00* (2006.01)
*F02B 3/06* (2006.01)

(52) U.S. Cl.
CPC ............ *F02F 3/22* (2013.01); *F05C 2201/021* (2013.01); *F05C 2201/0448* (2013.01); *Y10T 29/49256* (2015.01)

(58) Field of Classification Search
USPC ....................................................... 123/193.6
See application file for complete search history.

(56) References Cited

U.S. PATENT DOCUMENTS

| 4,898,905 | A |   | 2/1990  | Kawakami et al. |
|-----------|---|---|---------|-----------------|
| 5,239,955 | A |   | 8/1993  | Rao et al. |
| 5,257,603 | A |   | 11/1993 | Bauer et al. |
| 5,626,907 | A |   | 5/1997  | Hagiwara et al. |
| 5,670,010 | A |   | 9/1997  | Hagiwara et al. |
| 5,677,372 | A | * | 10/1997 | Yamamoto et al. ........... 524/495 |
| 5,884,600 | A |   | 3/1999  | Wang et al. |
| 6,162,767 | A |   | 12/2000 | Adam |
| 6,312,484 | B1| * | 11/2001 | Chou et al. ....................... 51/298 |
| 6,376,061 | B1|   | 4/2002  | Adam |
| 6,548,453 | B1|   | 4/2003  | Narasimhan et al. |
| 6,557,457 | B1|   | 5/2003  | Hart et al. |
| 6,770,381 | B2|   | 8/2004  | Kanayama et al. |
| 7,024,981 | B2|   | 4/2006  | Nigro et al. |
| 7,156,014 | B2|   | 1/2007  | Sugioka et al. |
| 7,241,722 | B2|   | 7/2007  | Murase et al. |
| 7,536,945 | B2|   | 5/2009  | Perrone |
| 7,603,944 | B2|   | 10/2009 | Nigro |
| 7,765,696 | B2|   | 8/2010  | Maier et al. |
| 2002/0155304 | A1 |   | 10/2002 | Tanaka et al. |
| 2007/0000468 | A1 | * | 1/2007  | Azevedo et al. .......... 123/193.4 |
| 2007/0082825 | A1 |   | 4/2007  | Kawakami et al. |
| 2008/0060603 | A1 | * | 3/2008  | Kuroda et al. ............. 123/193.6 |
| 2008/0163751 | A1 |   | 7/2008  | Subramanian et al. |

FOREIGN PATENT DOCUMENTS

| EP | 0024291 A1 | 3/1981 |
| EP | 0938970 A2 | 2/1999 |
| EP | 1892429 A2 | 2/2008 |
| JP | H0422611 A | 1/1992 |
| JP | H0624263 U | 3/1994 |
| JP | 2002242933 A | 8/2002 |
| JP | 2005201289 A | 7/2005 |
| JP | 2008056750 A | 3/2008 |
| JP | 2010514996 A | 5/2010 |
| WO | 2004070238 | 8/2004 |
| WO | WO 2010/076306 A1 | 7/2010 |

OTHER PUBLICATIONS

Wikipedia, Polyimide, Jun. 11, 2010, Wikipedia, 1-3.*
Endura Coatings World Headquarters, Polymer Composite Diamond Coating Specifications, 2012, Endura, p. 1 (note website discusses patents for composite diamond coatings going back a long time).*
International Search Report PCT/US2012/062032 dated Feb. 5, 2013.

* cited by examiner

US 9,945,480 B2

PISTON ASSEMBLY INCLUDING A POLYMER COATING WITH HARD PARTICLES APPLIED TO SLIDING SURFACES

CROSS REFERENCE TO RELATED APPLICATION

This application claims the benefit of U.S. provisional application Ser. No. 61/551,998 filed Oct. 27, 2011, the entire contents of which is incorporated herein by reference in its entirety. This application is also a Continuation-in-Part and claims the benefit of U.S. patent application Ser. No. 13/142,887, filed Jun. 30, 2011, which is incorporated herein by reference in its entirety.

BACKGROUND OF THE INVENTION

1. Field of the Invention

This invention relates generally to piston assemblies for internal combustion engine applications, and methods of forming the same.

2. Related Art

Piston assemblies for use in internal combustion engine applications typically comprise a piston body including a cross bore, a connecting rod also including a cross bore aligned with the cross bore of the piston body, and a wrist pin disposed in the aligned bores to couple the piston body to the connecting rod. In the past, bushings have been pressed between the cross bores and wrist pin to reduce friction and wear along the sliding surfaces of those components. Recently, in effort to reduce manufacturing complexity and costs, bushings have been replaced by low-friction coatings, for example the coatings disclosed in U.S. Pat. Nos. 7,024,981 and 6,557,457, both assigned to Federal-Mogul World Wide, Inc.

SUMMARY OF THE INVENTION

One aspect of the invention provides a piston assembly for an internal combustion engine comprising a piston body and a wrist pin. The piston body includes at least one first cross bore presenting a piston sliding surface. The wrist pin is disposed in the first cross bores and presents a pin sliding surface facing the piston sliding surfaces. A coating is disposed on at least one of the sliding surfaces. The coating includes a polymer matrix with hard particles disposed in the matrix.

Another aspect of the invention provides a method of forming a piston assembly. The method includes providing a piston body including at least one first cross bore presenting a piston sliding surface and providing a wrist pin presenting a pin sliding surface. The method further includes disposing a coating including a polymer matrix with hard particles in the matrix on at least one of the sliding surfaces.

The coating of the piston assembly lubricates the interface between the sliding surfaces and separates asperities of the sliding surfaces moving and rubbing against one another during use of the piston assembly in an internal combustion engine application. Thus, the coating reduces wear, scuff, heat, and stress on the sliding surfaces caused by friction between the sliding surfaces during operation. Test results suggest the coating of the present invention provides for reduced wear on the sliding surfaces, compared to other coatings and uncoated sliding surfaces.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
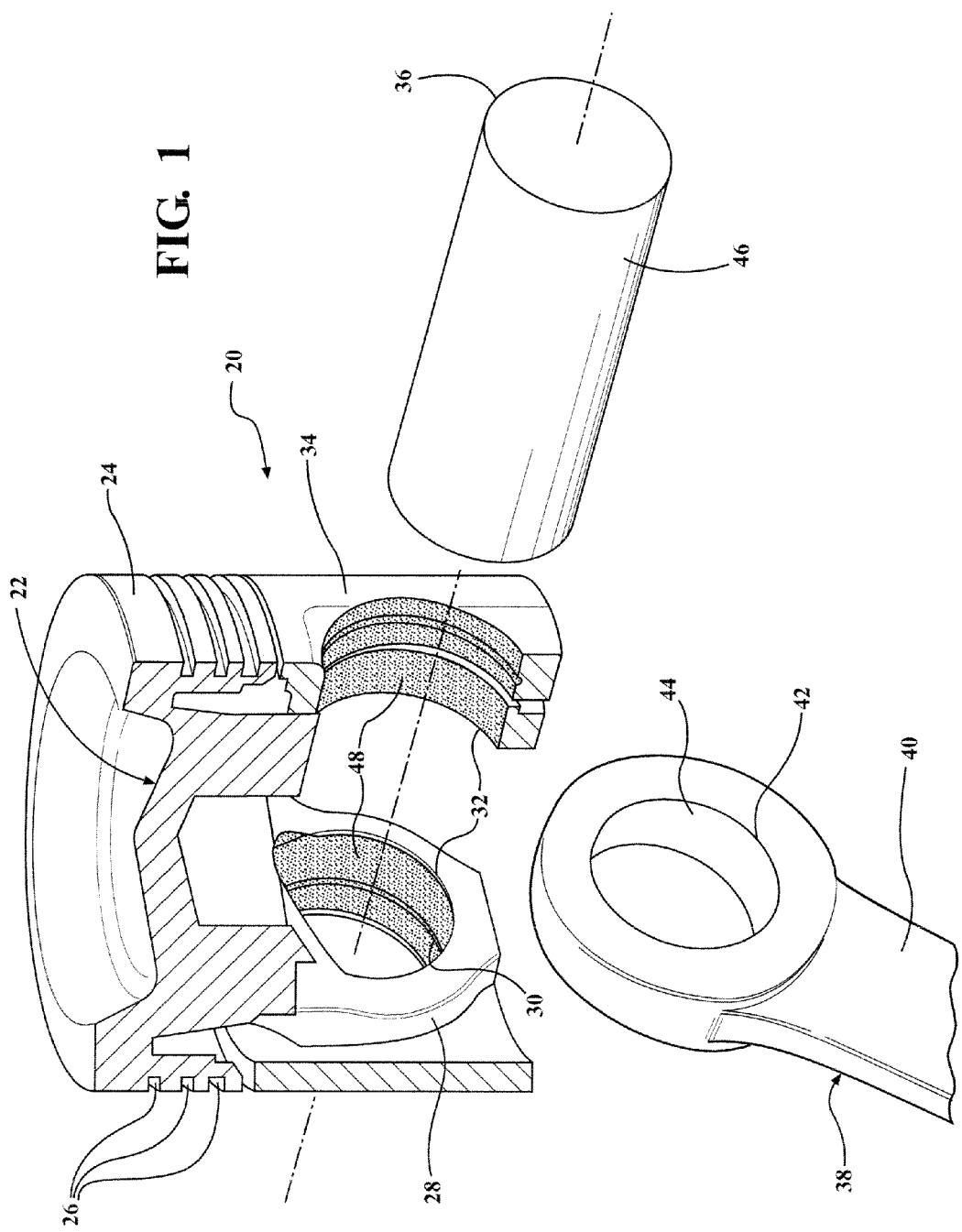
FIG. 1 is a perspective and partial cross-sectional view of a piston body, connecting rod, and a wrist pin according to one embodiment of the invention.

A piston assembly 20 constructed according to one embodiment of the invention is generally shown in FIG. 1. The piston assembly 20 comprises a piston body 22 having an upper crown portion 24 and a pin boss formation 28. The piston body 22 is preferably formed of a steel material and is either cast or forged. However, the piston body 22 can be formed of other metals, such as aluminum. The upper crown portion 24 is formed with ring grooves 26 for maintaining rings (not shown). The piston body 22 further includes the pin boss formation 28 depending from and integral with the upper crown portion 24. The pin boss formation 28 includes a first cross bore 30 presenting a piston sliding surface 32. The piston sliding surface 32 extends circumferentially around a center axis and can present oil grooves or clip grooves.

The piston body 22 also includes a skirt 34 extending longitudinally from the upper crown portion 24. In one embodiment, such as the embodiment of FIGS. 1 and 2, the skirt 34 is formed separate from the upper crown portion 24. The skirt 34 also includes a pair of first cross bores 30 each presenting a piston sliding surface 32. The first cross bore 30 of the pin boss formation 28 is disposed between the pair of first cross bores 30 of the skirt 34, as shown in FIG. 1. The first cross bores 30 of the skirt 34 are axially aligned with the first cross bore 30 of the pin boss formation 28. The skirt 34 can be formed from a material different from the steel material of the upper crown portion 24, such as aluminum. Alternatively, the skirt 34 and separate upper crown portion 24 can both be formed of steel.

Figure 4:
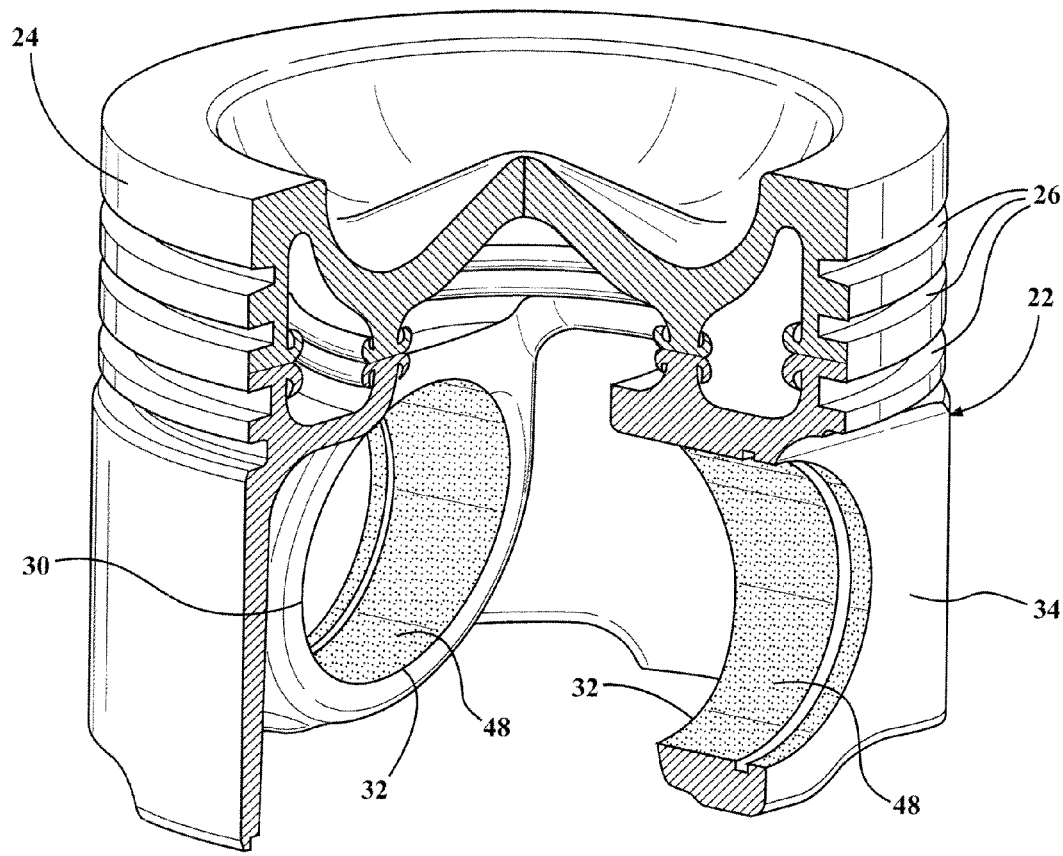
FIG. 4 is a perspective and partial cross-sectional view of a piston body and a wrist pin according to another embodiment of the invention.

The piston assembly 20 includes a wrist pin 36 joining the skirt 34 to the upper crown portion 24. The wrist pin 36 extends through the first cross bores 30 to provide an articulated structure. In another embodiment, shown in FIG. 4, the piston body 22 includes the skirt 34 formed integral with the upper crown portion 24 in a single piece construction. The skirt 34 of the single piece construction includes a pair of the axially aligned first cross bores 30 facing opposite one another and each having the piston sliding surface 32. The single construction can also be formed of various materials, such as steel, aluminum, or other metals. In yet another embodiment, the piston assembly 20 includes a fixed wrist pin 36 (not shown), wherein the wrist pin 36 is fixed to the first cross bores 30 via and interference fit.

The piston assembly 20 also includes a connecting rod 38 for connecting the piston body 22 to a crankshaft (not shown) of the internal combustion engine. The connecting rod 38 includes a shaft 40 having a small end formed with a second cross bore 42 for aligning with the first cross bores 30 of the pin boss formation 28 and skirt 34. The second cross bore 42 presents a rod sliding surface 44. The connecting rod 38 is preferably formed of steel or another metal and is either cast or forged.

The piston assembly 20 is formed by aligning the first cross bores 30 of the piston body 22 with the second cross bore 42 of the connecting rod 38, and then disposing the wrist pin 36 in the aligned cross bores 30, 42. Thus, the wrist pin 36 connects the connecting rod 38 to the piston body 22. If the piston body 22 comprises the single piece construction, then the wrist pin 36 connects the single piece construction to the connecting rod 38. The wrist pin 36 also has a pin sliding surface 46 facing outwardly toward the piston sliding surface 32 and the rod sliding surface 44. The wrist pin 36 is also preferably formed of steel or another metal. Alternatively, the piston assembly 20 can comprise other configurations with sliding surfaces or can be formed of other materials.

A coating 48 including a polymer matrix 50 with hard particles 52 disposed throughout the polymer matrix 50 is then disposed on at least one of the sliding surfaces 32, 44, 46, and preferably at least the piston sliding surface 32. The coating 48 may extend 360° along at least one of the sliding surfaces 32, 44, 46, thus encompassing the entire sliding surface 32, 44, 46. Alternatively, the coating 48 may extend less than 360° along at least one of the sliding surfaces 32, 44, 46, such as a fraction of at least one of the sliding surfaces 32, 44, 46.

In one embodiment, as shown in FIG. 1, the coating 48 is disposed continuously along the piston sliding surfaces 32 of the first cross bores 30. The embodiment of FIG. 4 also includes the coating 48 disposed continuously along the piston sliding surfaces 32 of the aligned first cross bores 30. In another embodiment, the coating 48 is disposed on the pin sliding surface 46 of the wrist pin 36 and/or the rod sliding surface 44 of the connecting rod 38. The coating 48 can alternatively be disposed on all of the sliding surfaces 32, 44, 46 or on any combination of the sliding surfaces 32, 44, 46. In one embodiment, the coating 48 has a thickness of 4 to 20 microns.

The coating 48 comprises the polymer matrix 50 and the plurality of hard particles 52 dispersed throughout the polymer matrix 50. Examples of the coating 48 are disclosed in International Publication No. WO 2010/076306 and U.S. patent application Ser. No. 13/142,887, which are incorporated herein by reference in their entirety. In one embodiment the coating 48 includes, in volume percent (vol. %) of the coating 48, the polymer matrix 50 in an amount of at least 40.0 vol. %, or at least 50 vol. %, or at least 60 vol. %, or at least 80 vol. %, or at least 85 vol. %, based on the total volume of the coating 48. The polymer matrix 50 can be formed of a single polymer or a mixture of polymers, resin, plastics, or duroplastics, and either thermoplastic or thermoset polymers. The polymer matrix 50 can also include synthetic and cross-linked polymers. Preferably, the polymer matrix 50 has a high temperature resistance and excellent chemical resistance. The polymer matrix 50 typically has a melting point of at least 210° C., preferably at least 220° C., or at least 230° C., or at least 250° C. In one embodiment, the polymer matrix 50 includes at least one of polyarylate, polyetheretherketone (PEEK), polyethersulfone (PES), polyamide imide (PAI), polyimide (PI), expoxy resin, polybenzimidazole (PBI), and silicone resin. In another embodiment, the polymer matrix 50 includes a bonding agent, such as an unsaturated polyester resin or silicone, hardened by means of UV radiation.

The hard particles 52 of the coating 48 are typically formed of a material having a hardness of at least 600 HV/0.5, more preferably at least 620 HV/0.5, and even more preferably at least 650 HV/0.5, at a temperature of 25° C. The hard particles 52 also have a particle size sufficient to affect at least one of the ductility, wear resistance, and strength of the coating 48. In one embodiment, the hard particles 52 have a D50 particle size by volume not greater than 10.0 microns, or not greater than 8.0 microns, or not greater than 6.0 microns, and preferably from 0.1 to 5.0 microns.

The D50 particle size by volume is the equivalent spherical diameter of the hard particles 52, also referred to as a D50 diameter, wherein 50.0 wt. % of the hard particles 52 have a larger equivalent spherical diameter and 50.0 wt. % of the hard particles 52 have a smaller equivalent spherical diameter. The D50 diameter is determined from a particle size distribution display of the hard particles 52, before any processing of the hard particles 52 following common testing practice. In one embodiment, the hard particles 52 include a mixture of particle sizes, such as a first group of particles having a smaller particle size than a second group of particles. The first and second groups of the hard particles 52 are typically dispersed evenly throughout the polymer matrix 50.

In one embodiment, the hard particles 52 of the coating 48 include at least one of metal nitrides, such as such as cubic BN, and $Si_3N_4$; metal carbides, such as SiC and $B_4C$; metal oxides, such as $TiO_2$, $Fe_2O_3$, and $SiO_2$; metal silicides, such as $MoSi_2$; metal borides; metal phosphides, such as $Fe_3P$; intermetallic compounds; metal oxynitrides; metal carbonitrides; metal oxycarbides; metal powders of Ag, Pb, Au, SnBi and/or Cu; and mixtures thereof. The coating 48 typically includes the hard particles 52 in an amount of 0.1 to 20.0 vol. %, or 3.0 to 8.0 vol. %, based on the total volume of the coating 48. In one embodiment, the coating 48 includes $Fe_2O_3$ as one of the hard particles 52 in an amount of 0.1 to 15.0 vol. %, or 0.5 to 8.0 vol. %, based on the total volume of the coating 28, and other hard particles 48 in an amount up to 5.0 vol. %, or 3.0 to 5.0 vol. %, based on the total volume of the coating 48.

The coating 48 also typically includes at least one solid lubricant, such as $MoS_2$, graphite, $WS_2$, hexagonal boron nitride (h-BN), and PTFE. The solid lubricant can also include metal sulfides with layered structures. In one embodiment, the coating 48 includes, in vol. % of the coating 48, the solid lubricant in an amount of 5.0 to 40.0 vol. %, or 5.0 to 30.0 vol. %, or up to 30.0 vol. %, or up to 9.5 vol. %, based on the total volume of the coating 48.

Figure 2:
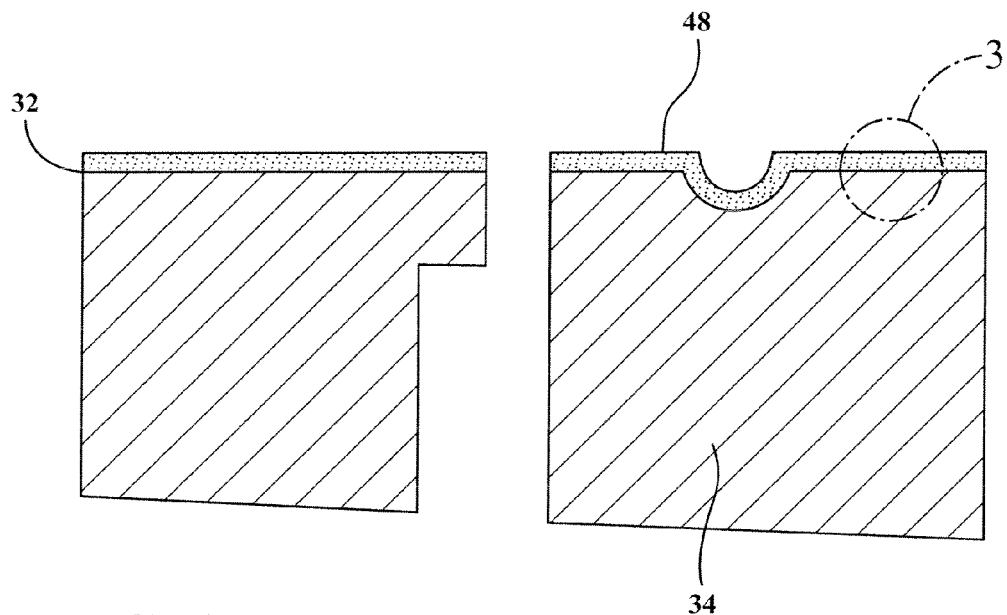
FIG. 2 is a cross-sectional view of a coating disposed on the piston body of FIG. 1.
Figure 3:
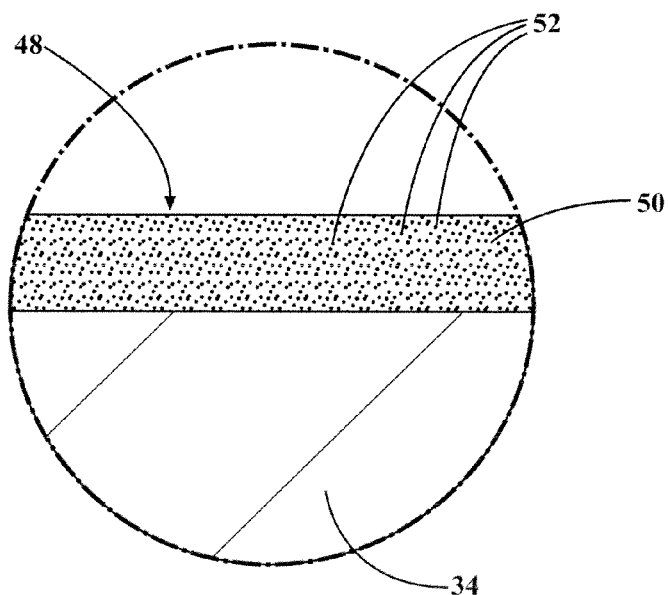
FIG. 3 is an enlarged cross-sectional view of the coating of FIG. 2.

The coating 48 is applied to at least one of the sliding surfaces 32, 44, 46, of the respective piston body 22, skirt 34, connecting rod 38, or wrist pin 36 presenting the sliding surface 32, 44, 46. The coating 48 can be applied as a liquid or a powder, and is typically applied according to methods disclosed in U.S. 2010/076306, or other methods. For example, the coating 48 can be applied to the sliding surfaces 32, 44, 46 by dipping, brushing, atomizing, spraying, printing, or screen printing. The coating 48 may be applied 360° along at least one of the sliding surfaces 32, 44, 46, thus encompassing the entire sliding surface 32, 44, 46. Alternatively, the coating 48 may be applied less than 360° along at least one of the sliding surfaces 32, 44, 46, such as a fraction of the sliding surface 32, 44, 46. In one embodiment, as shown in FIG. 2, the coating 48 is applied directly to the piston sliding surface 32 without another layer between the piston sliding surface 32 and the coating 48. In another embodiment, when the piston assembly 20 includes the fixed wrist pin 36, the method can include applying the coating 48 to the piston sliding surfaces 32 and/or the pin sliding surface 46 prior to fixing the wrist pin 36 to the piston sliding surfaces 32. The wrist pin 36 can also be heated prior to sliding the wrist pin 36 along the piston sliding surfaces 32 and through the first cross bores 30.

However, in another embodiment, multiple layers of the coating 48, as disclosed in WO 2010/076306, are applied to at least one of the sliding surfaces 32, 44, 46. The compositions of the layers can be the same or different from one another. For example, a primer can be applied to the piston sliding surface 32 before the coating 48 is applied. In another example, a layer of the polymer matrix 50, without the hard particles 52, is applied to the piston sliding surface 32 prior to applying the coating 48 with hard particles 52, or after applying the coating 48 with hard particles 52. Alternatively, several layers of the coating 48 are applied to the piston sliding surface 32 as a gradient, with the layer properties continuously changing along the thickness of the coating 48. For example, the amount of hard particles 52 can be higher in a base layer than in a top layer, or higher in a top layer than in a base layer. In one embodiment, the coating 48 comprises a plurality of layers, wherein the amount of $Fe_2O_3$ in the bottom layer is higher than the amount of $Fe_2O_3$ in the top layer.

The coating 48 of the piston assembly 20 lubricates the interface between the sliding surfaces 32, 44, 46 and separates asperities of the sliding surfaces 32, 44, 46 moving and rubbing against one another during use of the piston assembly 20 in an internal combustion engine application. The hard particles 52 in the polymer matrix 50 may lap or cover asperities of the adjacent sliding surfaces 32, 44, 46, thus affecting bearing ratio and reducing friction. The hard particles 52 may also lower localized pressure by increasing the surface area of the sliding surfaces 32, 44, 46. Thus, the coating 48 reduces wear, scuff, heat, and stress on the sliding surfaces 32, 44, 46 caused by friction between the sliding surfaces 32, 44, 46 during operation. Test results suggest the coatings 48 of the present invention provide for reduced wear on the sliding surfaces 32, 44, 46, compared to other coatings and uncoated metal sliding surfaces. Other advantages are provided by the piston assembly 20 with the fixed wrist pin 36. In this case, the coating 48 improves the fit of the wrist pin 36 in the first cross bores 30, improves tribology, and reduces noise during operation of the piston assembly 20. The coating 48 also compensates for imperfections and asperity variation along the piston sliding surface 32, and thus reduces manufacturing costs.

Obviously, many modifications and variations of the present invention are possible in light of the above teachings and may be practiced otherwise than as specifically described.

| ELEMENT LIST | |
|---|---|
| Element Symbol | Element Name |
| 20 | assembly |
| 22 | body |
| 24 | upper crown portion |
| 26 | grooves |
| 28 | pin boss formations |
| 30 | first cross bore |
| 32 | piston sliding surface |
| 34 | skirt |
| 36 | wrist pin |
| 38 | connecting rod |
| 40 | shaft |
| 42 | second cross bore |
| 44 | rod sliding surface |

| ELEMENT LIST | |
|---|---|
| Element Symbol | Element Name |
| 46 | pin sliding surface |
| 48 | coating |
| 50 | polymer matrix |
| 52 | hard particles |

What is claimed is:

1. A piston assembly, comprising:
   a piston body including at least one first cross bore presenting a piston sliding surface;
   a wrist pin disposed in said at least one first cross bore, said wrist pin presenting a pin sliding surface facing said piston sliding surface; and
   a coating disposed on at least one of said sliding surfaces, said coating including a polymer matrix with hard particles disposed in said matrix, and said hard particles including $Fe_2O_3$.

2. The piston assembly of claim 1, wherein said hard particles of said coating have a hardness of at least 600 HV/0.5 at a temperature of 25° C.

3. The piston assembly of claim 1, wherein said hard particles of said coating have a D50 particle size by volume not greater than 10.0 microns.

4. The piston assembly of claim 1, wherein said hard particles of said coating have a hardness of at least 650 HV/0.5 at a temperature of 25° C. and a D50 particle size by volume from 0.1 to 5.0 microns.

5. The piston assembly of claim 1, wherein said hard particles further include at least one of a metal nitride, metal carbide, metal oxide in addition to said $Fe_2O_3$, metal silicide, metal boride, metal phosphide, intermetallic compound, metal oxynitrides, metal carbonitride, metal oxycarbide, and a metal powder of Ag, Pb, Au, SnBi and/or Cu.

6. The piston assembly of claim 1, wherein said coating includes said hard particles in an amount of 0.1 to 20.0 vol. %, based on the total volume of said coating.

7. The piston assembly of claim 6, wherein said coating includes said hard particles in an amount of 3.0 to 8.0 vol. %, based on the total volume of said coating.

8. The piston assembly of claim 1, wherein said polymer matrix includes at least one of polyarylate, polyetheretherketone (PEEK), polyethersulfone (PES), polyamide imide (PAI), polyimide (PI), expoxy resin, polybenzimidazole (PBI), and silicone resin.

9. The piston assembly of claim 1, wherein said polymer matrix has a melting point of at least 210° C.

10. The piston assembly of claim 1, wherein said polymer matrix includes polyamide imide (PAI).

11. The piston assembly of claim 1, wherein said coating includes said polymer matrix in an amount of at least 40.0 vol. %, based on the total volume of said coating.

12. The piston assembly of claim 1, wherein said coating includes at least one solid lubricant in an amount of 5.0 to 40.0 vol. %, based on the total volume of the coating, and said solid lubricant includes at least one of a metal sulfide, hexagonal boron nitride (h-BN), PTFE.

13. The piston assembly of claim 1 further comprising a connecting rod including a second cross bore presenting a rod sliding surface, said second cross bore being axially aligned with said at least one first cross bore of said piston body, and wherein said wrist pin is disposed in said aligned cross bores and couples said piston body to said connecting rod.

14. A piston assembly, comprising:
a piston body formed of a metal material and including a plurality of first cross bores each presenting a piston sliding surface;
said piston body including an upper crown portion and a pin boss formation depending from and integral with said upper crown portion;
said pin boss formation including one of said first cross bores;
said piston body including a skirt extending longitudinally from said upper crown portion;
said skirt including a pair of said first cross bores each presenting said piston sliding surface and axially aligned with said first cross bore of said pin boss formation;
said first cross bore of said pin boss formation being disposed between said pair of first cross bores of said skirt;
a connecting rod including a shaft having a small end formed with a second cross bore for aligning with the first cross bores of the piston body;
said second cross bore presenting a rod sliding surface;
a wrist pin extending through said first cross bores and said second cross bore to join said skirt to said upper crown portion and said piston body to said connecting rod;
said wrist pin including a pin sliding surface facing toward said rod sliding surface;
a coating disposed on at least one of said sliding surfaces;
said coating including a polymer matrix with hard particles disposed throughout said polymer matrix;
said coating including said polymer matrix in an amount of at least 40.0 vol. %, based on the total volume of said coating;
said polymer matrix having a melting point of at least 210° C.;
said polymer matrix including at least one of polyarylate, polyetheretherketone (PEEK), polyethersulfone (PES), polyamide imide (PAI), polyimide (PI), expoxy resin, polybenzimidazole (PBI), and silicone resin;
said coating including said hard particles in an amount of 0.1 to 20.0 vol. %, based on the total volume of said coating;
said hard particles having a hardness of at least 600 HV/0.5 at a temperature of 25° C. and a D50 particle size by volume not greater than 10.0 microns;
said hard particles including $Fe_2O_3$;
said coating including at least one solid lubricant in an amount of 5.0 to 40.0 vol. %, based on the total volume of the coating;
said solid lubricant including at least one of a metal sulfide, hexagonal boron nitride (h-BN), PTFE; and
said coating having a thickness of 4 to 20 microns.

15. A method of forming a piston assembly, comprising the steps of:
providing a piston body including at least one first cross bore presenting a piston sliding surface and a wrist pin presenting a pin sliding surface; and
disposing a coating including a polymer matrix with hard particles in the matrix on at least one of the sliding surfaces, wherein the hard particles include $Fe_2O_3$.

16. The method of claim 15 including providing a connecting rod including a second cross bore presenting a rod sliding surface; axially aligning the second cross bore of the connecting rod with the at least one piston sliding surface of the piston body; and disposing the wrist pin in the aligned cross bores to couple the piston body to the connecting rod.

17. The method of claim 15, wherein the coating includes the hard particles in an amount of 0.1 to 20.0 vol. %, based on the total volume of the coating, the hard particles have a hardness of at least 600 HV/0.5 at a temperature of 25° C., and the hard particles have a D50 particle size by volume not greater than 10.0 microns.

18. The method of claim 15, wherein the coating is applied by at least one of the following steps: dipping, brushing, atomizing, spraying, printing, and screen printing.

19. The method of claim 15, wherein the hard particles further include at least one of a metal nitride, metal carbide, metal oxide in addition to the $Fe_2O_3$, metal silicide, metal boride, metal phosphide, intermetallic compound, metal oxynitrides, metal carbonitride, metal oxycarbide, and a metal powder of Ag, Pb, Au, SnBi and/or Cu.

20. The piston assembly of claim 1, wherein said hard particles of said coating include said $Fe_2O_3$ in an amount of 0.1 to 20.0 vol. %, based on the total volume of said coating; said polymer matrix of said coating includes at least one of polyarylate, polyetheretherketone (PEEK), polyethersulfone (PES), polyamide imide (PAI), polyimide (PI), expoxy resin, polybenzimidazole (PBI), and silicone resin in an amount of at least 40.0 vol. %, based on the total volume of said coating; and said coating includes at least one of a metal sulfide, hexagonal boron nitride (h-BN), PTFE in an amount of 5.0 to 40.0 vol. %, based on the total volume of said coating.

21. The method of claim 15, wherein the hard particles of the coating include the $Fe_2O_3$ in an amount of 0.1 to 20.0 vol. %, based on the total volume of the coating; the polymer matrix of the coating includes at least one of polyarylate, polyetheretherketone (PEEK), polyethersulfone (PES), polyamide imide (PAI), polyimide (PI), expoxy resin, polybenzimidazole (PBI), and silicone resin in an amount of at least 40.0vol. %, based on the total volume of the coating; and the coating includes at least one of a metal sulfide, hexagonal boron nitride (h-BN), PTFE in an amount of 5.0 to 40.0 vol. %, based on the total volume of the coating.

* * * * *